United States Patent Office 3,356,637
Patented Dec. 5, 1967

3,356,637
VINYL CHLORIDE INTERPOLYMERS
AND PROCESS
Robert J. Slocombe, Kirkwood, Mo., assignor to Monsanto
Company, a corporation of Delaware
No Drawing. Filed May 27, 1963, Ser. No. 283,577
12 Claims. (Cl. 260—33.6)

The present invention is directed to interpolymers of vinyl chloride with diesters of fumaric acid in which the esterifying groups are hydroxyalkyl radicals or hydroxyalkylene ether radicals, and to methods of preparing such interpolymers by interpolymerizing vinyl chloride with such diesters.

Polyvinyl chlorides are well known commercial molding resins. While such resins have valuable and useful properties, they are at the same time limited by their properties to certain general applications. In the present invention it has been discovered that the incorporation of certain di-hydroxylated fumarates as comonomer with vinyl chloride results in modification of various properties and also the hydroxyl groups provide a site for curing or crosslinking or additional reactions.

It is an object of the present invention to prepare an hydroxylated polyvinyl chloride suitable for use as a coating resin.

It is another object to prepare a hydroxylated vinyl chloride polymer which is of relatively low molecular weight. It is yet another object to prepare a hydroxylated vinyl chloride polymer which is thermosetting or rendered thermosetting by treatment with various curing or crosslinking agents.

The interpolymers of the present invention result from interpolymerization of vinyl chloride with diesters of fumaric acid as represented by the formula:

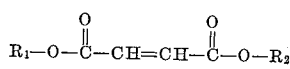

in which $R_1$ and $R_2$ are individually selected from

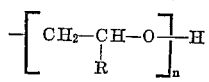

or

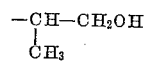

where $n$ is a number of average value from 1 to 8 and R is hydrogen or methyl. It is preferred that R be hydrogen and $n$ be 1, and particularly preferred that both $R_1$ and $R_2$ be hydroxyethyl. It will be understood that the fumarate esters employed in the present invention have the trans structure characteristic of fumaric acid and its esters. The interpolymerization involved is an addition polymerization in which the vinyl linkage of the vinyl chloride and the olefinic carbon-to-carbon bond of the fumarate take part.

The hydroxyl-bearing radicals suitable as esterifying groups can be termed hydroxy(oxa)hydrocarbyl radicals, it being understood that oxygen atoms can interrupt the hydrocarbon units and be present in an alkylene or polyalkylene ether chain, or can be absent leaving a strictly hydrocarbon group between the hydroxy group and the oxygen of the

group to which the hydrocarbyl radical is attached.

The ratio of monomers forming the interpolymer can vary considerably, depending upon the application in view. For example, amounts of the defined hydroxy fumarates can vary from less than about 2% to 75% or more by weight, although ordinarily the amount of the particular hydroxy fumarates will be in the range of 5% to 55% by weight. In applications in which the polymer is to be used in solution as a coating material, it is preferred that the particular dihydroxy fumarates be present in the polymer in amounts to give a hydroxyl content of about 1% to 4% by weight, requiring around 5% to 20% by weight of diglycol fumarate. It is often advisable to employ other fumarates, e.g., dialkyl fumarates, along with the diglycol fumarate, to constitute the foregoing ranges of fumarates, or in some cases to provide additional fumarate, for its plasticization effect as, for example having a total fumarate content of 10% to 40% by weight of the polymer while the amounts of dihydroxy fumarate are such as to provide hydroxyl content in the foregoing defined ranges. The defined hydroxyl contents are particularly suitable for polymers to be used in solution as coating materials; it is easier to obtain the low molecular weights suitable for solubility if the amounts of the fumarate are relatively high or relatively large amounts of fumarate are present in addition to the dihydroxy fumarate, although alternative means of controlling molecular weight are effective to some extent. In the case of polymers for molding and laminating applications, particularly for thermosetting properties, the use of fairly high amounts of the particular dihydroxy fumarates is often advantageous as it contributes to the curing and thermosetting properties.

As fumarates for use in addition to the dihydroxy fumarates, fumarates in general are suitable as represented by $R_1OOCCH=CHCOOR_2$ in which $R_1$ and $R_2$ can individually be alkyl, cycloalkyl, aryl, aralkyl, alkaryl, etc. It is preferred that $R_1$ and $R_2$ be identical and be alkyl groups of no more than 10 carbon atoms, e.g., methyl, ethyl, propyl, isopropyl, butyl, isobutyl, t-butyl, pentyl, n-hexyl, isohexyl, octyl, decyl, etc.

The interpolymers of the present invention can be produced in various molecular weight ranges; however it is preferred that they have molecular weight ranges of the order of 1000 to 25,000 or more particularly, 100 to 10,000 (number average molecular weights as determined by vapor phase osmometer). In solution and coating applications, the use of relatively low molecular weights, often less than 5000, is important with respect to solubility and viscosity, and it is also significant with respect to obtaining low melt viscosity for laminating applications. For solution applications in general, it is desirable that the polymers be soluble in toluene, xylene or other aromatic hydrocarbon solvents at 50% by weight solids concentrations, and also in ketone solvents, or in mixtures of aromatic and ketone solvents, containing for example up to 50% of methyl isobutyl ketone or 4-methoxy-4-methyl-pentanone-2, in contrast to the very limited solubility of polyvinyl chloride in toluene, xylene or such ketones as methyl ethyl ketone, although lesser concentrations such as 30% or 40% by weight can at times be used.

The copolymers of the present invention are prepared under conditions suitable for free-radical catalyzed polymerization of vinyl compounds. The polymerization is generally conducted at slightly elevated temperatures at atmospheric or autogenous pressures in the presence of peroxide or azo catalysts. Temperatures of the order of 50 to 100° C., are preferred, and it is generally desirable not to exceed temperatures of 140–150° C., because of thermal stability considerations. If desired, low temperature catalysts, e.g., trialkyl boron in combination with oxygen, can be employed to conduct the polymerization at very low temperatures, e.g., −20 or −30° C., or lower or the polymerization can be effected at room temperature. The temperature and amount of catalyst can be regulated to control molecular weight of the copolpmer, higher temperatures and higher amounts of catalysts causing production of lower molecular weights. The polymerization media also influence molecular weight, polymerization in solution, for example, resulting in lower molecular weight copolymer than obtained in emulsion polymerization. Solution, mass or emulsion polymerization systems can be employed in the present invention. When use of the copolymer as a solution for coating applications is contemplated, it will often be desirable to conduct the polymerization in solution. Various hydrocarbon or ketone solvents are suitable as solution media, e.g., xylene, toluene, benzene, acetone, cyclohexanone, n-hexane, kerosene, etc. It at times is desirable to use a solvent which dissolves the monomers but which has little or no solvent power with respect to the polymer, causing the polymer to precipitate as formed.

The fumarates employed in the present invention enter the polymer at a faster rate than vinyl chloride. Hence heterogeneous polymer product can be obtained by simply continuing an ordinary batch polymerization to a fairly high conversion without adding additional monomer. However, it is generally desirable to obtain a fairly uniform product; this can be done by stopping the polymerization at a fairly low conversion, e.g., at a point where substantially all of the fumarate has polymerized. Alternatively, a relatively uniform ratio of unpolymerized monomers can be maintained by addition of fumarate or vinyl chloride and fumarate, or by removal of vinyl chloride at the proper rates.

Since the fumarates enter the polymer at a fast rate, they can be charged to the polymerization in relatively very small amounts, for example fractions of 1% to 5% by weight. For example, it would seldom be necessary to exceed 20% by weight of the monomer charge to obtain very high percentages of fumarate in the polymer, and ordinarily the amount of bis(hydroxyalkyl) fumarate would be no greater than about 10% by weight of the monomers and in fact often no more than 5% by weight. When fumarates other than bis(hydroxyalkyl) fumarates are present in the charge, they can be used in varying proportions, but the bis(hydroxyalkyl) fumarate often constitutes from one-fourth to three-fourths of the fumarate content on a molar basis, and usually about one-half of the fumarate content on a molar basis. It is not necessary to maintain a precisely constant monomer ratio, but the fumarates employed should be present in substantial amount at all times if relatively uniform polymer is to be obtained.

Example 1

Vinyl chloride, 97.9 parts by weight, and diglycol fumarate, i.e., bis(hydroxyethyl) fumarate, 2.1 parts by weight, were charged to a bomb with 0.1 mol percent of azobisisobutyronitrile and 15 ml. acetone and heated to 80° C., for 10 minutes to give a copolymer of 80.3% vinyl chloride and 19.7% fumarate (chlorine 45.55% by weight), which was soluble to form a 40% by weight solids solution in a 50:50 methyl isobutyl ketone:xylene mixture. The copolymer can be coated on metal or other substrates and cured by heating, particularly with curing agents such as the butylated melamine formaldehyde resin sold under trademark "Resimene" 882. The conversion in the foregoing procedure was 5.4%.

Example 2

The procedure of Example 1 was duplicated except that the time was 5 minutes. The conversion was 1.5% and the copolymer contained 73.6% vinyl chloride and 26.4% fumarate.

Example 3

The procedure of Example 1 was duplicated except that the time was 12 minutes to give a conversion of 9.1%. The resulting copolymer contained 83.78% vinyl chloride and 16.22% fumarate.

Example 4

Vinyl chloride, 96.1 parts by weight, diglycol fumarate, 2.1 parts by weight, and diethyl fumarate, 1.8 parts by weight, were charged to a bomb with 15 ml. acetone and 0.1 mol percent of azobisisobuyronitrile and heated to 80° C., for 5 minutes to obtain 2% conversion to polymer. The interpolymer contained 72% vinyl chloride and 28% fumarates, the diglycol fumarate and diethyl fumarate being in approximately equimolar amounts. The interpolymer was soluble in an amount of 50% by weight in 50:50 methyl isobutyl ketone:xylene solution. Cured coating of the polymer on metal had good mechanical properties, exhibiting no failures in impact, bend and adhesion tests and also having good hardness. The polymers can be cured, for example, by heating the polymer with about 3% to 14% (dry weight) of butylated urea-formaldehyde resin sold under trademark "Resimene" U920 at 150° C., for 15 minutes or with similar concentrations of butylated melamine formaldehyde resin sold under trademark "Resimene" 882.

Example 5

The procedure of Example 4 was repeated but a reaction time of 10 minutes was employed. A 7.3% conversion to polymer was obtained and the polymer had 75.84% vinyl chloride content. The polymer was soluble in an amount of 50% in methyl isobutyl ketone:xylene solution and cured to a coating of good mechanical properties. When the reaction time was changed to 15 minutes, the conversion was 15% and the soluble polymer had a vinyl chloride content of 81.42% by weight.

It is generally desirable that the dihydroxy fumarates employed herein be relatively free of unesterified fumaric acid groups, e.g., that the bis(hydroxyalkyl) fumarate contain less than 5%, and often less than 2% or 1% of mono (hydroxyalkyl) fumarate. For example, monomer requiring less than 0.14 milliequivalent base/gram for neutralization or even less than 0.105 milliequivalent base/gram is suitable. At times it may be advantageous to counteract the acidity with stoichiometrically equivalent amounts of organic amine, e.g., triethyl amine.

Various catalysts can be employed in the polymerization of the present invention, for example, inorganic or organic peroxide, azo catalysts and redox catalysts. Azo catalysts such as those illustrated in U.S. Patent Numbers 2,471,959; 2,515,628; 2,520,338; 2,520,339; and 2,565,573 can be employed; to further illustrate, azobisisobutyronitrile, methyl azobisisobutyrate, and diethyl-2,2'-azobis-(2-methyl propionate) are suitable. Peroxy catalysts such as peroxides or carbonates can be employed, e.g., ditertiary-butyl peroxide, benzoyl peroxide, lauroyl peroxide, tert-butyl perbenzoate, etc. Various boron hydride or alkyl boron catalyst can also be employed, e.g., trialkyl boron in combination with oxygen.

It will be recognized that the interpolymers of the present invention can include other monomers in addition to the vinyl chloride and bis(hydroxyalkyl) fumarate monomers, for example, in amounts up to 15% or so, various vinyl monomers copolymerizable with vinyl chloride, for example, vinyl acetate, ethyl acrylate, methyl methacrylate, etc., being suitable.

What is claimed is:

1. An interpolymer of vinyl chloride and diester of fumaric acid in which the esterifying radicals are hydroxy(oxa) hydrocarbyl groups and in which from about 2% to about 75% by weight of the said interpolymer is from the said diester.

2. An interpolymer of vinyl chloride and a fumarate compound of formula

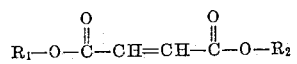

in which $R_1$ and $R_2$ are individually selected from the group consisting of:

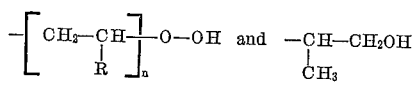

where $n$ is a number of average value from 1 to 8 and R is selected from the group consisting of methyl and hydrogen and in which from about 2% to about 75% by weight of the said interpolymer is from the said fumarate compound.

3. An interpolymer of vinyl chloride and bis(hydroxyalkyl) fumarate in which the hydroxyalkyl groups contain up to 10 carbon atoms and in which from about 2% to about 75% by weight of said interpolymer is from said bis(hydroxyalkyl) fumarate.

4. The interpolymer of claim 1 in which dialkyl fumarate is included as a third constituent.

5. The interpolymer of claim 3 in which the molecular weight is in the range of about 1000 to 10,000 and a hydroxyl content of 1% to 4% by weight.

6. An interpolymer of vinyl chloride and bis(hydroxyethyl) fumarate and in which from about 2% to about 75% by weight of said interpolymer is from said bis(hydroxyethyl) fumarate.

7. A solution containing interpolymer and monocyclic aromatic hydrocarbon solvent, the interpolymer constituting at least 30% by weight of the solution and being an interpolymer of vinyl chloride and bis(hydroxyalkyl) fumarate and having a molecular weight in the range of 1000 to 10,000 and a hydroxyl content of 1% to 4% by weight.

8. The process of preparing polymers which comprises interpolymerizing vinyl chloride and diester of fumaric acid in which the esterifying groups are hydroxy(oxa) hydrocarbyl groups in the presence of free-radical catalyst the said diester being provided in an amount to form about 2% to 75% by weight of the resulting interpolymer and the said diester being relatively free of unesterified fumaric acid groups and containing less than 2% of mono(hydroxyalkyl) fumarate.

9. The process of claim 8 in which the catalyst is an azo catalyst.

10. The process of preparing interpolymers which comprises interpolymerizing vinyl chloride and bis(hydroxyalkyl) fumarates in the presence of free-radical catalyst and having the fumarates present in substantial amount during the entire polymerization but on the average no greater than about 10% by weight of the monomers.

11. The process of obtaining coatings of vinyl chloride/bis(hydroxyalkyl) fumarate polymers which comprises interpolymerizing vinyl chloride and bis(hydroxyalkyl) fumarate in the presence of free-radical catalyst the said fumarate being used in an amount to give a hydroxyl content of 1% to 4% by weight in the resulting polymers, and depositing a coating of the resulting polymer on a substrate from solution in aromatic solvent.

12. The process of claim 11 in which the said fumarate is present in substantial amount during the entire polymerization but on the average no greater than about 5% by weight of the monomers.

References Cited

UNITED STATES PATENTS

| | | | |
|---|---|---|---|
| 3,027,358 | 3/1962 | Ebersback et al. | 260—78.5 |
| 3,230,203 | 1/1966 | Kuhne | 260—78.5 |

FOREIGN PATENTS

| | | |
|---|---|---|
| 467,383 | 8/1950 | Canada. |
| 622,823 | 6/1961 | Canada. |
| 200,291 | 9/1938 | Switzerland. |

MORRIS LIEBMAN, *Primary Examiner.*

ALLAN LIEBERMAN, *Examiner.*